United States Patent
Stellenberg et al.

(10) Patent No.: US 8,259,715 B2
(45) Date of Patent: Sep. 4, 2012

(54) SYSTEM AND METHOD FOR TRAFFIC LOAD BALANCING TO MULTIPLE PROCESSORS

(75) Inventors: Gerald S. Stellenberg, Austin, TX (US); Brian C. Smith, Fort Worth, TX (US); James M. Rolette, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 526 days.

(21) Appl. No.: 11/782,840

(22) Filed: Jul. 25, 2007

(65) Prior Publication Data

US 2009/0028045 A1   Jan. 29, 2009

(51) Int. Cl.
| | |
|---|---|
| H04L 12/26 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl. ......... 370/389; 370/230; 370/468; 709/224
(58) Field of Classification Search .......... 370/225–231, 370/260–352, 389–468; 709/203–238; 726/3–23; 718/104–105
See application file for complete search history.

(56) References Cited

U.S. PATENT DOCUMENTS

| | | | |
|---|---|---|---|
| 6,067,545 A * | 5/2000 | Wolff | 1/1 |
| 6,101,508 A * | 8/2000 | Wolff | 709/223 |
| 6,760,775 B1 * | 7/2004 | Anerousis et al. | 709/238 |
| 7,289,498 B2 * | 10/2007 | Yu et al. | 370/389 |
| 7,321,926 B1 * | 1/2008 | Zhang et al. | 709/220 |
| 7,584,301 B1 * | 9/2009 | Joshi | 709/244 |
| 7,590,149 B1 * | 9/2009 | Bharali et al. | 370/468 |
| 7,701,951 B2 * | 4/2010 | Chapman et al. | 370/395.52 |
| 7,779,071 B2 * | 8/2010 | Lor et al. | 709/203 |
| 7,940,661 B2 * | 5/2011 | Ervin et al. | 370/232 |
| 8,009,558 B2 * | 8/2011 | Ward et al. | 370/229 |
| 2002/0107962 A1 * | 8/2002 | Richter et al. | 709/225 |
| 2003/0095501 A1 * | 5/2003 | Hofner et al. | 370/225 |
| 2003/0110154 A1 * | 6/2003 | Ishihara et al. | 707/1 |
| 2004/0015408 A1 * | 1/2004 | Rauen et al. | 705/26 |
| 2005/0080890 A1 * | 4/2005 | Yang et al. | 709/223 |
| 2006/0029097 A1 * | 2/2006 | McGee et al. | 370/468 |
| 2006/0031569 A1 * | 2/2006 | Desic et al. | 709/238 |
| 2006/0062243 A1 * | 3/2006 | Dacosta | 370/464 |
| 2006/0294219 A1 * | 12/2006 | Ogawa et al. | 709/224 |
| 2008/0095048 A1 * | 4/2008 | Zhong | 370/229 |
| 2008/0219268 A1 * | 9/2008 | Dennison | 370/395.2 |

* cited by examiner

*Primary Examiner* — Man Phan

(57) ABSTRACT

A method for load balancing selects one of a set of distribution formulas to associate packets of each of multiple communications sessions traversing a link to one of a plurality of output links and assigns the associated packets of at least one of the communications sessions to a different output link.

17 Claims, 5 Drawing Sheets

SYSTEM AND METHOD FOR TRAFFIC LOAD BALANCING TO MULTIPLE PROCESSORS

FIELD OF THE INVENTION

The present invention relates in general to the field of computer networks and more specifically, to performing packet traffic distribution among multiple processors for processor load balancing).

BACKGROUND OF THE INVENTION

The use of networks has grown significantly over the last few years. Concurrently, the sophistication of internal and external network attacks in the form of viruses, Trojan horses, worms and malware of all sorts has increased dramatically. Just as dramatic is the accelerated increase of network speeds and a corresponding drop in their cost, thereby driving their rapid adoption. Those factors and others have necessitated the development of innovative, more advanced and faster network security mechanisms.

For example, Intrusion Detection Systems (IDS) would often detect network attacks, but as passive systems they offered nothing more than after-the-fact attack notification. In contrast, Intrusion Prevention Systems (IPS) have been developed to complement traditional security products such as firewalls by proactively analyzing network traffic flows and active connections while scanning incoming and outgoing requests. As network traffic passes through an IPS, it is examined for malicious packets. If a potential threat is detected or traffic is identified as being associated with an unwanted application it is blocked, yet legitimate traffic is passed through the IPS.

Properly implemented. IPSs can be an effective network security safeguard. However, there is a current need for additional IPS capabilities, such as the ability to scale existing IPSs to accommodate higher network link speeds and balance traffic loads across multiple IPSs. Similarly, there is a growing demand for greater numbers of port types and port counts, as well as enhanced availability during system failures, replacements or updates.

Patent application Ser. No. 11/443,490, "Intrusion Prevention System Edge Controller," filed on May 30, 2006 by Smith et al. and incorporated herein by reference in its entirety, describes a load sharing of traffic from network ports (E-ports) to IPS ports (I-ports). Known methods to distribute traffic from E-Ports to I-Ports attempt to distribute the traffic load equally across multiple processors by hashing on source and destination address fields to the packets, but the resulting distributions can vary at each processor based on the traffic patterns. Therefore, there is a need for a traffic load balancing that overcomes the problems of the prior art to provide traffic load balancing for even distribution to multiple processors receiving the traffic in a dynamically changing variety of traffic patterns.

SUMMARY OF THE INVENTION

The invention is a method for load balancing. One of a plurality of distribution formulas is selected to associate packets of each of a plurality of communications sessions traversing a link to one of a plurality of output links. The associated packets of at least one of the communications sessions are assigned to a different output link.

The selecting can include applying the distribution formulas to the packets of the communications sessions to identify a particular distribution formula that associates packets of a substantially equal number of the communications sessions to each of the plurality of output links, or associates packets of the communications sessions to each of the plurality of output links such that the processing load at each link is substantially equal.

A pointer to an output table entry can be generated for each packet associated with an output link. The output table entry is initiated with an output link assignment according to the association. The output table is monitored to determine a distribution of load parameters among processors associated with the output links. Entries in the output table associated with packets of at least one of the communications sessions are overwritten to assign the packets to a different output link.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION OF THE PREFERRED EMBODIMENTS

The invention provides a system and method for distributing packet traffic in a network substantially evenly across a set of links, each link connected to one of multiple processors. The invention adapts to dynamically varying traffic patterns. While the embodiments described below are related to load balancing packet traffic flows to processors for intrusion prevention systems (IPSs), it should be understood that the invention can be applied to any network environment performing load balancing of network traffic across multiple links, e.g. links to processors.

Load balancing as applied to IPSs must ensure that packets in a particular communication session are all sent to the same link, i.e., link to the same processor. In our example IPS embodiment shown in FIG. 1, traffic is sent through separate processors of individual multi-processor IPs 118, 128 and 132. However, it should be understood that our load balancing can apply to traffic sent to multiple standalone IPSs. In any embodiment, all the packets of a communication session between two parties must be processed by the same IPS processor. In a preferred embodiment, the invention is implemented within an IPS having multiple processors performing intrusion prevention operations. However, it should be appreciated that the invention can be implemented as a stand-alone device, or in a switch or router transmitting packet traffic to the multiple processors. e.g., as described in patent application Ser. No. 11/443,490, "Intrusion Prevention System Edge Controller," filed on May 30, 2006 by Smith et al.

Figure 1:
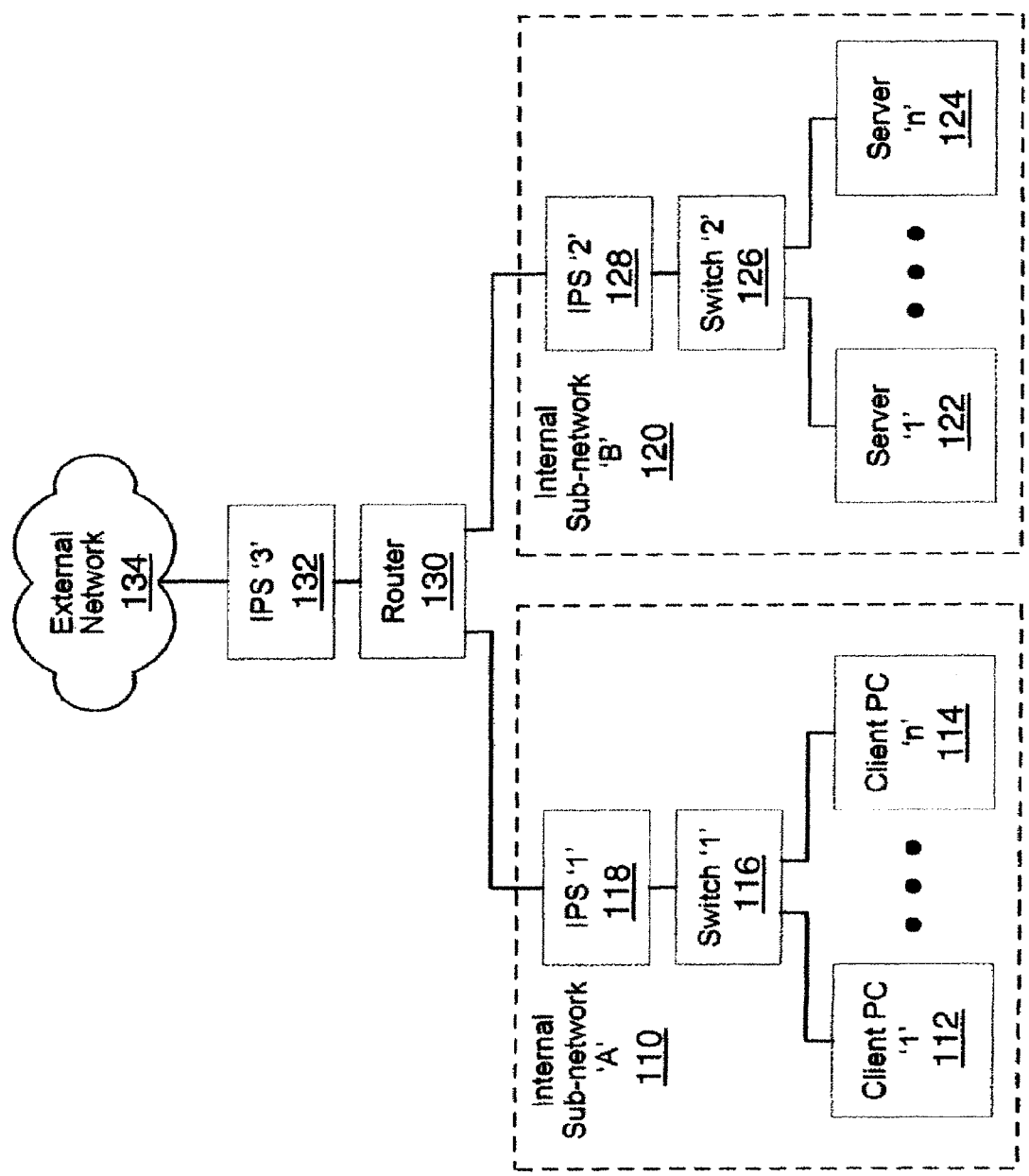
FIG. 1 is a block diagram of a network system that can use the invention.

FIG. 1 is a generalized block diagram illustrating a plurality of Intrusion Prevention Systems (IPSs) 118, 128, 132, as commonly implemented in a network environment. In this illustration, internal sub-network 'A' 110 is comprised of client personal computer (PC) '1' 112 through client PC 'n'

114, connected to switch '1' 116, which in turn is connected to IPS '1' 118. Internal sub-network 'B' 120 is comprised of server '1' 122 through server 'n' 124, connected to switch '2' 126, which in turn is connected to IPS '2' 128. Internal sub-network 'A' 110 and internal sub-network 'B' 120 are connected to router 130, which is connected to IPS '3' 132, which in turn is connected to external network 134. IPS '3' 132 is commonly implemented to prevent the intrusion of security threats into internal sub-network 'A' 110 and internal sub-network 'B' 120 from external network 134.

IPS '1' 118 provides additional intrusion protection by preventing the intrusion of security threats originating from internal sub-network 'A' 110. Likewise, IPS '2' 128 provides additional intrusion protection by preventing the intrusion of security threats originating from internal sub-network B' 120. As will be apparent to skilled practitioners of the art, the implementation of IPS '1' 118 isolates intrusion issues to internal sub-network 110, comprised of one or more client PCs 112 through 114 and corresponding switch '1' 116. Similarly, the implementation of IPS '2' 128 isolates intrusion issues to internal sub-network 120, comprised of one or more servers 122 through 124 and corresponding switch '1' 126.

Known distribution formulas for load balancing, which ensure traffic associated with a particular communication session is directed to the same link, perform one of many known hashing methods to at least source and destination fields of the packets, e.g. Layer 3 IP addresses, and optionally others fields in Layer 3 or fields in other layers of the OSI model, and use a subset of the bits of the resultant hash to indicate an output link number. The mix of source and destinations that make up the packets and the hashing method determine how the packets will be distributed to the output links. Depending on the effectiveness of a particular distribution formula when applied to a particular traffic mix, results can vary from one link getting all the packets, to the packets shared evenly across all the links, to any variation between those extremes. The invention can use the above or other known distribution formulas for performing load balancing that do not perform hashing, but hashing methods are employed in our preferred embodiment.

Figure 2:
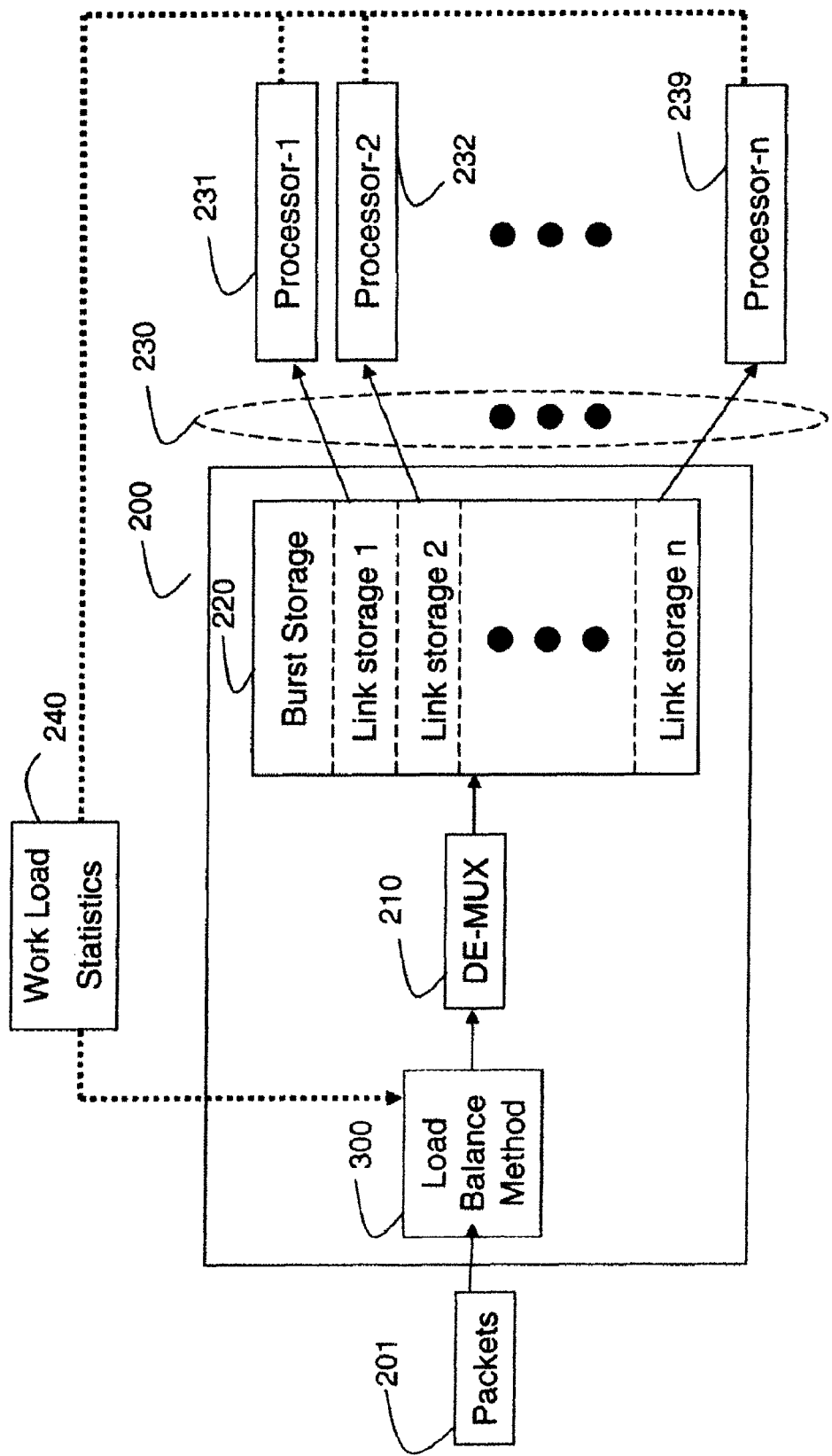
FIG. 2 is a block diagram of a load balancing system including the invention.

FIG. 2 shows a load balancing system 200 that performs two stage load balancing 300 according to the invention. Packets 201 for all network traffic on a particular link in which the invention is implemented are input to the two stage load balancing 300 where each packet is associated with an output link. The two stage load balancing 300 is described in greater detail in FIGS. 3 and 4. Referring back to FIG. 2, de-multiplexer 210 reads the packets 201, which may also include data 411 generated by the load balancing 300 and including data derived from link workload statistics 240, e.g., feedback including processor load statistics, to distribute the packets directly to an assigned link in a set of links 230 connected to processors 231-239, or preferably to the links via burst storage 220. The burst storage 220 buffers packets coming in at one rate and leaving at another rate. The burst storage includes link storages 1 through n allocated for each of the output links 230 associated with processors 1-n, e.g., processors 231-239 in FIG. 2. The DE-MUX function 210 reads the packet and the data 411 and can use the data 411 to direct the packets to assigned output links 230 via the burst storage 220. Some or all of the data 411 may be written in addition to and/or instead of some or all of the packet data before it is sent to an assigned output link.

Figure 3:
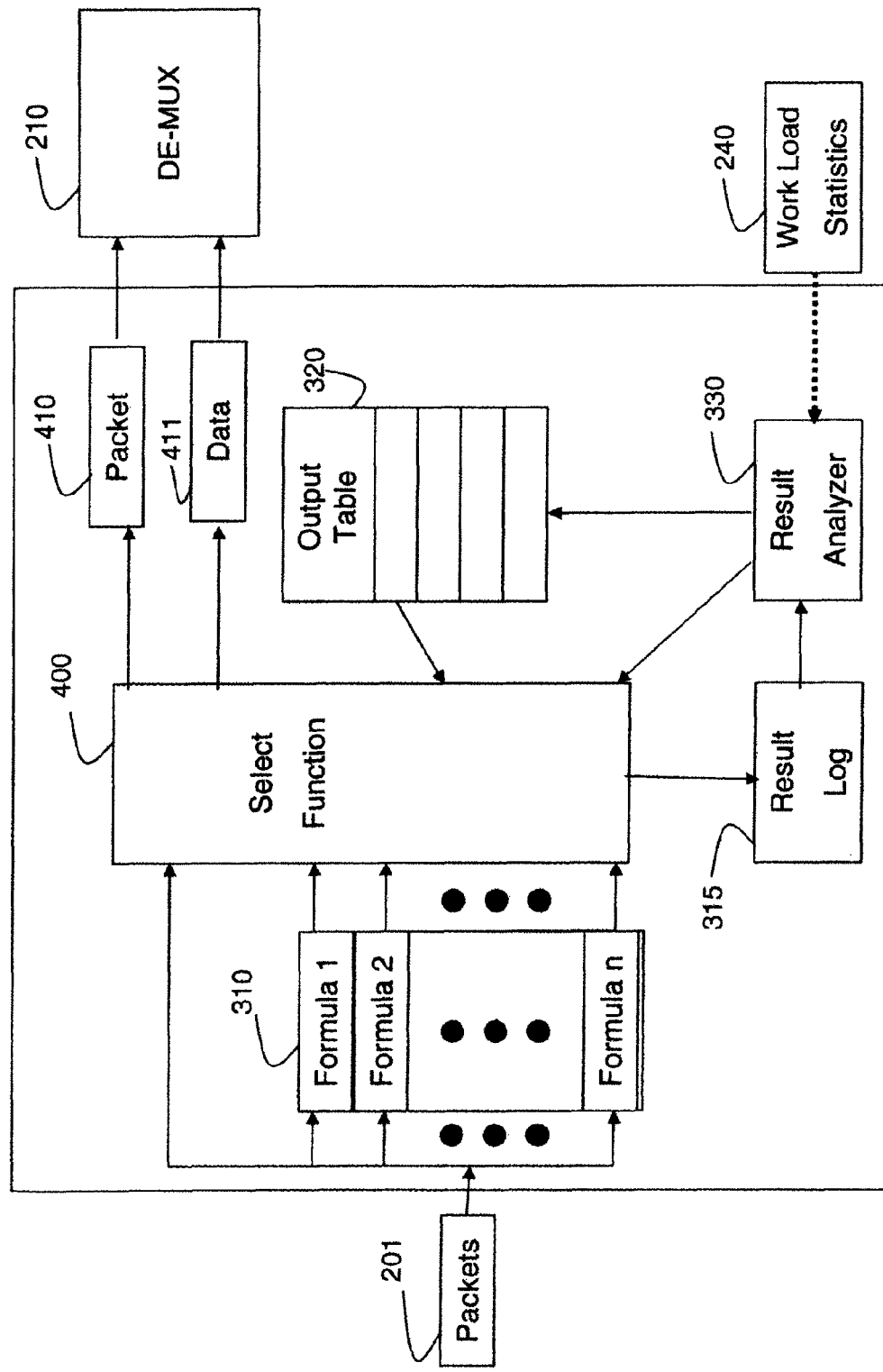
FIG. 3 is a block diagram of a two stage load balancer shown in FIG. 2.

Referring now to FIG. 3, the load balancing system 300 according to the invention takes as input packets 201. Each of a set of distribution formulas 310 processes fields of each packet and outputs distribution results stored in a results log 315. The results stored in the log 315 fire compared in a results analyzer 330. One distribution formula of the set 310 is selected to be used by select function 400, to perform traffic distribution in the first stage. Thereafter, the output of the selected distribution formula generates, for each packet 201, a pointer to an output table 320. The output table 320 includes data that identifies an output link associated with the packet and thereby which IPS processor may process the packet. The output table 320 can also include the data, which may be appended to or written in the packet. Each of multiple regions of the output table includes entries associated with one of the links 230.

Figure 4:
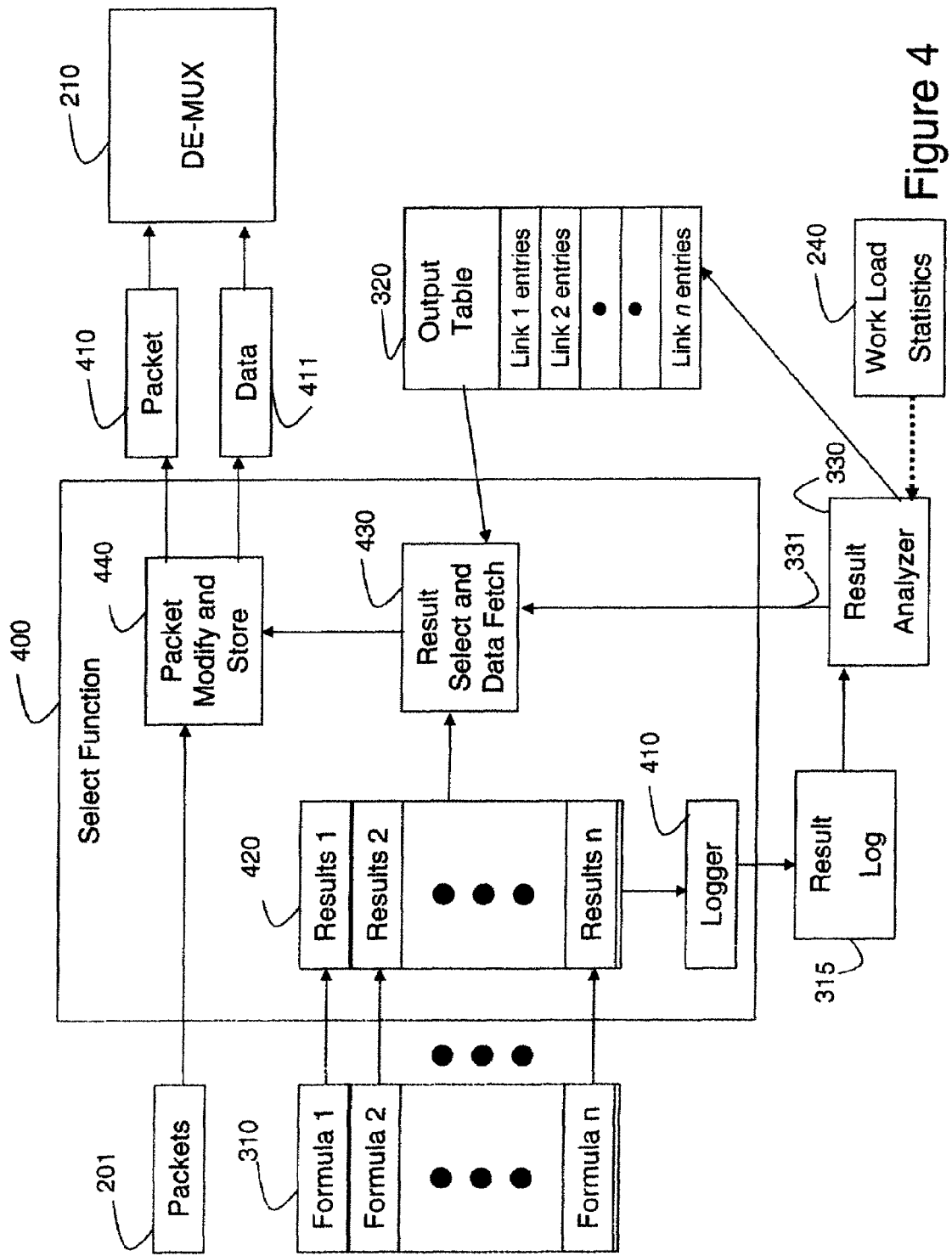
FIG. 4 is a block diagram of a select function shown in FIG. 3.

As stated above, in the first stage of our two stage load balancing method the incoming packets 201 are input to each of the set of distribution formulas 310 to identify a formula in the set that yields a most even traffic distribution, e.g., distributes load evenly to each of the output links. In the preferred embodiment, multiple distribution formulas e.g. formulas 1 through n in set 310, are calculated in parallel with the resulting output distributions recorded via select function 400 in results log 315. The recorded distributions are compared to select a distribution formula for a current traffic pattern. While the selected distribution formula is performing the traffic distribution, the other distribution formulas in the set 310 continue to receive and process the packets 201 in parallel with the selected distribution formula. Referring briefly to FIG. 4, the results of all of the distribution formulas 310 are stored, e.g., by logger 410, and periodically compared by the results analyzer 330 to determine if another of the distribution formulas in the set 310 is providing a more even distribution for the packets 201 at the time of a particular periodic comparison. Optionally, the set can include a single distribution formula.

The first stage distribution formulas generate a mapping of fields in the packets 201 to a numerical value associated with one link in the set of links 230. As stated above, a prior art technique would be to pick a subset of the bits outputted from the hash-based distribution formula. The chosen bits would be used to indicate the link number to send the packet to be processed. So, if the packets where being spread across four links connected to four IPS processors, then two bits of the hash would be chosen and the two bits would indicate the processor number 0, 1, 2, or 3 to process the associated packet. In contrast, the invention selects a number of bits that matches a size of the output table 320. So, if the output table contains 65,536 entries, then 16 bits of the resulting numerical value from applying the load balance formula would be used to point to an entry or region in the output table associated with one of the multiple links. Therefore, in the case of four processors, the output table would be filled with 16,384 entries indicating that processor 0 will process associated packets, 16,384 entries for processor 1, 16,384 entries for processor 2, and 16,384 entries for processor 3.

Referring back to FIG. 3, the second stage of our two-stage load balancing method monitors how many packets, bytes, or other load parameters have been directed to each processor. If this second stage monitoring determines that the distribution is uneven, then entries in the output table associating packets to a particular link can be over written to distribute the packets more evenly among the set of links. The over writing can assign packets in a communication session associated with an output link to a different output link. If the entries in the output table for packets in a communication session associated with an output link are not over written, the associated output link is used.

Therefore, the invention can change the formula in the first stage and can further adjust the distribution by modifying entries in the output table in the second stage. This provides two adjustable parameters, the mapping formula to generate the output table pointer, and the output table link number entries. These two parameters can be monitored and tuned to spread the traffic stream analysis load given dynamic traffic patterns.

The result analyzer 330 reads the result log 315 and work load statistics 240 and determines which formula to use and how the to fill the entries in the output table 320 to provide an even distribution of packets to the output links. The distribution of pointers output by the selected distribution formula in the first stage, the associated output table link number entries, and previous load parameters are used by the result analyzer 330 to determine if a new formula should be selected by comparing the selected distribution formula output with the output of the other distribution formulas in the set. If a new formula is selected then new formula identifier is communicated to the select function 400, e.g. via select signal 331. The select signal 331 indicates to the select function 400 which distribution formula output should be used to generate a pointer to the output table 320 to get data 411 used to associate with a particular packet 410 of the input packets 201; to select the output link; and optionally the appended data 411 is used to add or modify data in the packet. The packets 410 and the appended data 411 are transferred out of the load balance function 300 via the demux 210 and are stored in the burst storage 220.

In the second stage of our two stage load balancing, the result analyzer 330 may also overwrite the output table link number entries to better distribute the load. The second stage monitors the work load statistics 240 to determine how many packets, bytes, or other load parameters have been directed to each processor. If this second stage monitoring indicates that the distribution is uneven, then entries in the output table can be over written in an attempt to spread the load more evenly. For example, entries in the output table can be re-written to indicate a packets associated with a particular communication session are assigned a different link than originally associated by the selected distribution formula.

The load parameters included in the work load statistics can range in complexity and scope. There is a traffic load component of the load parameters which can be recorded as packet and or bytes transferred to an IPS processor number or link number. Other load parameters have a computational load component. The traffic analyzed by an IPS processor may vary the amount of computation needed to determine if the traffic contains a threat to the network due to the traffic contents or volume.

Therefore, result analyzer 330 can periodically change the selected formula in the first stage and can further adjust the distribution by modifying entries in the output table in the second stage. This creates two adjustable types of parameters, a first type associated the distribution formula to generate the output table pointers, and a second type associated with the output table link number entries. These two types of parameters can be monitored and tuned to spread the traffic stream analysis load given the current traffic streams.

FIG. 4 shows the select function 400 in greater detail. The result outputs 420 from the distribution formula set 310 are stored, e.g. as result 1 through result n. These results are read by the logger 310 and written to the results log 315. The pointer portion of each formula result is read from the results 310 by the results select and data fetch function 430. Which result to use was previously indicated by the select signal 330 communicated to the results select and data fetch function 430 by the result analyzer 330. This pointer is used by the results select and data fetch function 430 to fetch data.

Fetched data is passed 431 to the packet modify and store function 440. The packet-modify-and-store function 440 uses this data to write information into the burst storage 220 via the DE-MUX function 210. The burst storage 220 will use the data 411 to direct the packet 410 to an output link. The Packet Modify and Store function 330 may also use this data to add data to the packet or modify the packet data.

Figure 5:
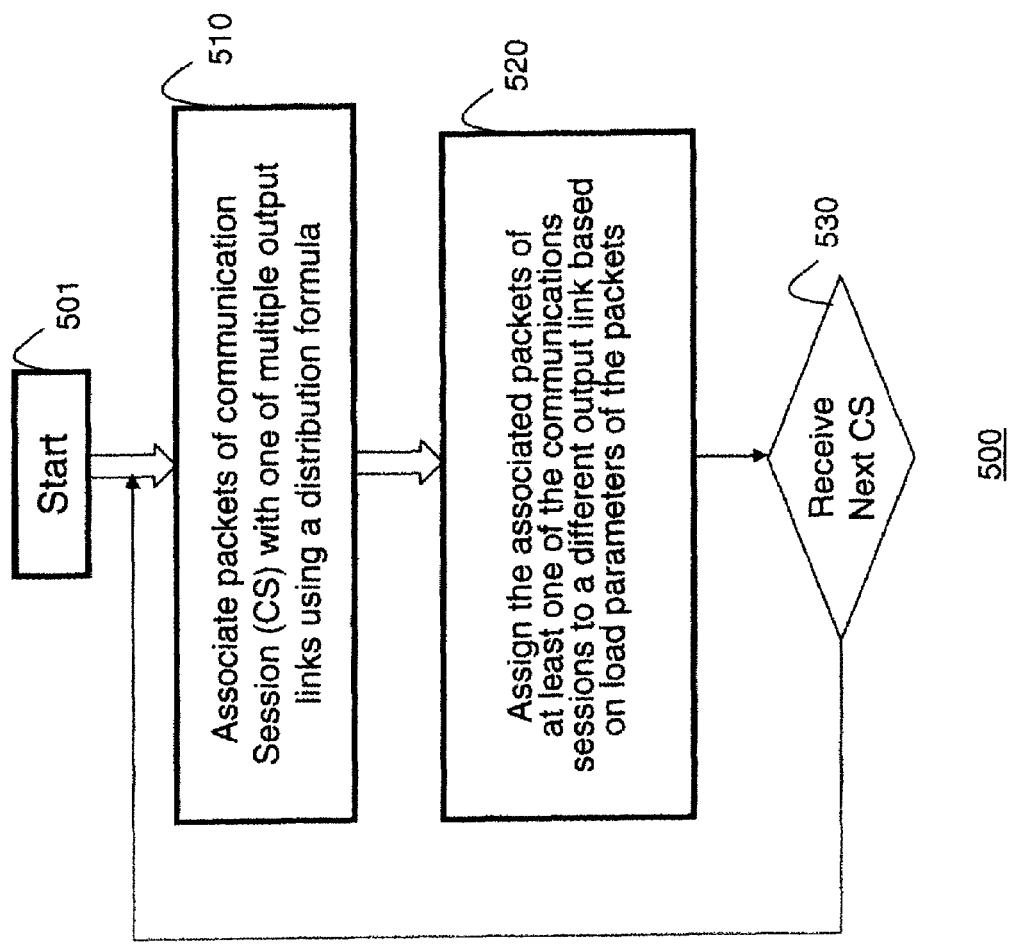
FIG. 5 is a flow diagram of the two stages of the invention.

As shown in FIG. 5, when the invention starts 501, packets of a communications session are associated 510 with one of multiple output links using a distribution formula applied to a plurality of communications sessions. Packets of at least one of the communications sessions are then assigned 520 to a different link based on load parameters. The invention repeats the process 530 for successive communications sessions.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed:

1. A method for load balancing, comprising:
applying each of a plurality of distribution formulas to packets of a plurality of communications sessions;
selecting one of the plurality of distribution formulas to associate the packets of each of the plurality of communications sessions traversing a link to one of a plurality of output links based upon outputs resulting from application of the plurality of distribution formulas;
monitoring distribution of packets outputted through the plurality of output links; and
assigning the associated packets of at least one of the communications sessions to an output link other than the output link to which the packets of the at least one of the communications sessions is associated in response to the distribution of packets through the plurality of output links being uneven with respect to each other.

2. The method of claim 1, wherein the selecting further comprises:
identifying a particular distribution formula of the plurality of distribution formulas that associates packets of a substantially equal number of the communications sessions to each of the plurality of output links; and
selecting the particular distribution formula.

3. The method of claim 1, further comprising:
generating, for each packet associated with an output link, a pointer to an output table entry; and
initializing, for the each packet associated with the output link, the output table entry with the output link assignment according to the association.

4. The method of claim 3, further comprising:
monitoring the output table entries to determine a distribution of packets using load parameters among processors associated with the output links; and
overwriting entries in the output table associated with packets of the at least one of the communications sessions to assign the packets to a different output link based on the load parameters.

5. The method of claim 4, wherein the load parameters are received as feedback from the processors.

6. The method of claim 4 wherein the associating is based on a distribution of the plurality of communications sessions and the overwriting is based on load parameters appended to the packets.

7. The method of claim 6, wherein the load parameters include a number of bytes in a communications session.

8. The method of claim 6, wherein the monitoring further comprises:
- determining load parameters for each communications session associated with an output link by reading the data appended to each packet in a communications session assigned to the output link.

9. A load balancer, comprising:
- a first stage module to apply each of a plurality of distribution formulas to packets of a plurality of communications sessions, to select one of the plurality of distribution formulas to associate the packets of each of the plurality of communications sessions traversing a link to one of a plurality of output links based upon outputs resulting from application of the plurality of distribution formulas; and
- a second stage module operable to monitor distribution of packets outputted through the plurality of output links and assign the associated packets of at least one of the communications sessions to an output link other than the output link to which the packets of the at least one of the communications sessions is associated in response to the distribution of packets through the plurality of output links being uneven with respect to each other.

10. A method for load balancing, comprising:
- associating packets of each of a plurality of communications sessions traversing a link to one of a plurality of output links by using a distribution formula that ensures that the packets of a particular communications session are associated with the same output link, wherein each of the plurality of communications sessions comprises a communication session between separate pairs of parties;
- monitoring distribution of packets outputted through the plurality of output links; and
- assigning the associated packets of at least one of the communications sessions to a different output link in response to the distribution of packets through the plurality of output links being uneven with respect to each other.

11. The method of claim 1, wherein selecting one of a plurality of distribution formulas further comprises selecting one of a plurality of distribution formulas that ensures that the packets of a particular communications session are associated with the same output link, wherein each of the plurality of communications sessions comprises a communication session between separate pairs of parties.

12. The load balancer of claim 9, wherein the first stage module is further to select one of a plurality of distribution formulas that ensures that the packets of a particular communications session are associated with the same output link, wherein each of the plurality of communications sessions comprises a communication session between separate pairs of parties.

13. The load balancer of claim 9, wherein the first stage module is to identify a particular distribution formula of the plurality of distribution formulas that associates packets of a substantially equal number of the communications sessions to each of the plurality of output links, and to select the particular distribution formula.

14. The load balancer of claim 9, wherein the first stage module is to generate, for each packet associated with an output link, a pointer to an output table entry, and to initialize, for the each packet associated with the output link, the output table entry with the output link assignment according to the association.

15. The load balancer of claim 14, wherein the second stage module is to monitor the output table entries to determine a distribution of packets using load parameters among processors associated with the output links, and to overwrite entries in the output table associated with packets of the at least one of the communications sessions to assign the packets to a different output link based on the load parameters.

16. The method of claim 10, further comprising:
- generating, for each packet associated with an output link, a pointer to an output table entry; and
- initializing, for the each packet associated with the output link, the output table entry with the output link assignment according to the association.

17. The method of claim 16, further comprising:
- monitoring the output table entries to determine a distribution of packets using load parameters among processors associated with the output links; and
- overwriting entries in the output table associated with packets of the at least one of the communications sessions to assign the packets to a different output link based on the load parameters.

* * * * *